United States Patent
Sugiyama et al.

(10) Patent No.: US 7,846,545 B2
(45) Date of Patent: Dec. 7, 2010

(54) GLASS FIBER PACKAGE, METHOD FOR PACKING OF GLASS FIBER AND GLASS FIBER PRODUCT USING THE SAME

(75) Inventors: Shoji Sugiyama, Tokyo (JP); Takashi Shidomi, Tokyo (JP); Masahiro Kawachi, Tokyo (JP)

(73) Assignee: Nippon Sheet Glass Company, Limited, Tokyo (JP)

( * ) Notice: Subject to any disclaimer, the term of this patent is extended or adjusted under 35 U.S.C. 154(b) by 272 days.

(21) Appl. No.: 12/078,094

(22) Filed: Mar. 27, 2008

(65) Prior Publication Data
US 2008/0241539 A1 Oct. 2, 2008

(30) Foreign Application Priority Data
Mar. 29, 2007 (JP) ............................. 2007-089063

(51) Int. Cl.
*D02G 3/00* (2006.01)
*D04H 1/00* (2006.01)

(52) U.S. Cl. .................. 428/401; 442/348; 442/410; 264/319

(58) Field of Classification Search ............. 428/401; 442/348, 410; 264/319
See application file for complete search history.

(56) References Cited
U.S. PATENT DOCUMENTS 5,206,100 A * 4/1993 Muto et al. ............... 429/247
5,225,298 A * 7/1993 Nakayama et al. .......... 429/252

FOREIGN PATENT DOCUMENTS

GB 2427191 A * 12/2006

* cited by examiner

*Primary Examiner*—Norca L Torres-Velazquez
(74) *Attorney, Agent, or Firm*—Kratz, Quintos & Hanson, LLP

(57) ABSTRACT

An object of the present invention is to provide a glass fiber package where a glass fiber aggregate which contains alkali-containing glass wool fiber of a very small diameter having an average fiber size of 5 μm or less or, particularly, less than 1 μm and containing 5% or more by weight or, particularly, 10% or more by weight of alkali metal oxide components is packed in a compressed state to give a form which is able to be handled as a freight, and in which, fiber breakage (lowering in the fiber length) and fiber adhesion caused by compression packing is hardly resulted even upon a long-term storage whereby the properties inherent to the glass fiber immediately after its manufacture is apt to be maintained; to provide a method for packing the glass fiber; and to provide a glass fiber product using the same.

A glass fiber package of the present invention includes a glass fiber aggregate which contains alkali-containing glass wool fiber having an average fiber size of 5 μm or less and containing 5% or more by weight of alkali metal oxide components is packed in a compressed state so as to give a form which is able to be handled as a freight where the bulk density is 80 to 135 kg/m$^3$.

11 Claims, No Drawings

GLASS FIBER PACKAGE, METHOD FOR PACKING OF GLASS FIBER AND GLASS FIBER PRODUCT USING THE SAME

BACKGROUND OF THE INVENTION

1. Field of the Invention

The present invention relates to a glass fiber package in which a glass fiber aggregate which contains an alkali-containing glass wool fiber containing 5% or more by weight or, particularly, 10% or more by weight of alkali metal oxide components having a finely small diameter of an average fiber diameter of not larger than 5 μm or, particularly, smaller than 1 μm which is able to be advantageously used as a main material of, for example, a filter paper or a separator for a lead-acid battery is packed in a compressed state so as to give a form which is able to be handled as a freight; to a method for packing of glass fiber; and also to a glass fiber product using the same.

2. Description of the Related Art

Up to now, an alkali-containing glass wool fiber of a fine diameter where an average fiber size is 5 μm or less containing 5% or more by weight or, particularly, 10% or more by weight of alkali metal oxide components so as to impart a resistance to acid being able to be durable against a sulfuric acid electrolysis solution has been used as a main material for a separator for a lead-acid battery. Particularly in the case of a separator for a valve regulated lead-acid battery, it is necessary that the electrolysis solution is kept in a separator and, therefore, very fine glass fiber where an average fiber size is less than 1 μm has been used (the fiber where an average fiber size is up to about 0.5 μm has been practically used).

In such an alkali-containing glass wool fiber where an average fiber size is 5 μm or less or even smaller than 1 μm, a wool fiber which is made into fiber and manufactured by a method such as a flame attenuation process (a method where fused glass is flown in a yarn shape from the nozzles at the bottom of a fusing furnace and blown away with a high-speed flame) or a centrifugal process (rotary process or rotary fiberization process; a method where fused glass is provided to a cylindrical container where many orifices are bored at the surrounding wall called spinner being rotated at high speed, spun by centrifugal force and blown away by a high-speed steam) forms a fiber aggregate and, taking the packing efficiency upon transportation (volume reducing rate) into consideration, it is packed in a compressed state and handled.

Since the above glass fiber has a fine fiber size and a poor elasticity, there have been frequent problems that, when it is packed in a compressed state and is handled, the fiber length becomes short due to breakage such as bending of the fiber and the properties inherent to the glass fiber material available immediately after the manufacture of the glass fiber are unable to be achieved. When the fiber size is fine, such an influence is significant.

For example, in the above-mentioned separator for a valve regulated lead-acid battery, it is usually prepared by subjecting only the above glass fiber where an average fiber size is smaller than 1 μm to a wet paper manufacturing to form a sheet where the basis weight is not more than about 170 g/m$^2$ and, since it is necessary to ensure a predetermined tensile strength substantially by the entangling action of the glass fiber only, there is an inconvenience that, when the fiber length of the glass fiber material is short, an operation of making into a sheet itself is not possible or tensile strength after making into a sheet is insufficient. Further, since the above-mentioned separator for a valve regulated lead-acid battery is used in such a manner that, usually, a separator is bent into a U shape so as to enclose any of positive and negative plates therein whereby it is installed between positive and negative plates, there is an inconvenience that, when the fiber length of the glass fiber material becomes short, cracks are apt to be resulted at the bent part of the separator. Incidentally, as to a yardstick for estimating the degree of changes in the glass fiber length in the above glass fiber paper sheet through wet paper making process, elongation of said sheet is to be measured. In recent years, a product where a wet paper manufacturing is conducted using the above glass fiber having less than 1 μm of an average fiber size as a main material to form into a sheet having a basis weight of not more than about 30 g/m$^2$ has been used as a separator for electric double layer capacitors.

Since glass fiber has a high affinity to water (angle of contact is 0°) and its very fine fiber has a big specific surface area, the above glass fiber material adsorbs water in the air during the storage period, etc. from the stage of being made into fiber and manufactured until the stage of being used as a separator for a lead-acid battery, etc. Although its degree varies depending upon fiber size, packing state, storage environment, etc., the fiber surface usually adsorbs water in an amount of about 0.5 to 1.0% by weight in the case of the above glass fiber where an average fiber size is smaller than 1 μm. When much amount of water is adsorbed with the surface of the glass fiber, there happens a phenomenon that alkali metal oxide components (such as $Na_2O$, $K_2O$ and $Li_2O_3$) in the glass fiber are eluted and glass fibers are adhered each other. When the glass fibers are adhered each other, the fiber size becomes large and there is resulted an inconvenience that the properties inherent to the glass fiber material which are available immediately after the manufacture of glass fiber are no longer achieved. Such an adhesion phenomenon has been found to be affected not only by glass fiber size, alkali metal oxide amount of the glass fiber, storing period, storing environment, etc., but also by packing density (degree of compression) in the compression packing. Thus, it has been found that, although the above eluting phenomenon of the alkali metal oxide components is resulted principally independently of the packing density, the adhesion phenomenon is resulted being caused by the above eluting phenomenon at the places where the glass fibers are contacted each other and, when the packing density (degree of compression) is higher, the contacting places and contacting areas of the glass fibers increase whereby the above adhesion phenomenon is apt to happen.

SUMMARY OF THE INVENTION

In view of the above-mentioned problems in the prior art, an object of the present invention is to provide a glass fiber package where a glass fiber aggregate which contains alkali-containing glass wool fiber of a very small diameter having an average fiber size of 5 μm or less or, particularly, less than 1 μm and containing 5% or more by weight or, particularly, 10% or more by weight of alkali metal oxide components is packed in a compressed state to give a form which is able to be handled as a freight, and in which, fiber breakage (lowering in the fiber length) and fiber adhesion caused by compression packing is hardly resulted even upon a long-term storage whereby the properties inherent to the glass fiber immediately after its manufacture is apt to be maintained; to provide a method for packing the glass fiber; and to provide a glass fiber product using the same.

In order to achieve the above-mentioned object, the glass fiber package according to the present invention includes, as mentioned in the embodiment 1, a glass fiber aggregate which contains alkali-containing glass wool fiber having an average fiber size of 5 μm or less and containing 5% or more by weight of alkali metal oxide components and is packed in a compressed state so as to give a form which is able to be handled as a freight where the bulk density is 80 to 135 kg/m$^3$.

The glass fiber package mentioned in the embodiment 2 is that, in the glass fiber package mentioned in the embodiment 1, the glass fiber has an average fiber size of less than 1 μm.

The glass fiber package mentioned in the embodiment 3 is that, in the glass fiber package mentioned in the embodiment 1, the glass fiber contains 10% or more by weight of the alkali metal oxide components.

A method for packing the glass fiber of the present invention includes, as mentioned in the embodiment 4, packing a glass fiber aggregate which contains an alkali-containing glass wool fiber having an average fiber size of 5 μm or less and containing 5% or more by weight of alkali metal oxide components in a compressed state by pressurizing under the condition where the bulk density of the glass fiber aggregate does not exceed 135 kg/m$^3$ and forming a package where the bulk density is 80 to 135 kg/m$^3$ which is a form of being able to be handled as a freight so that the above-mentioned object is able to be achieved.

The method for packing the glass fiber mentioned in the embodiment 5 is that, in the method for packing the glass fiber mentioned in the embodiment 4, the glass fiber has an average fiber size of less than 1 μm.

The method for packing the glass fiber mentioned in the embodiment 6 is that, in the method for packing the glass fiber mentioned in the embodiment 4, the glass fiber contains 10% or more by weight of alkali metal oxide components.

A glass fiber product of the present invention includes, as mentioned in the embodiment 7, using a glass fiber material prepared by unpacking of the glass fiber package mentioned in the embodiment 1 so that the above-mentioned object is able to be achieved.

A filter paper of the present invention includes, as mentioned in the embodiment 8, using a glass fiber material prepared by unpacking of the glass fiber package mentioned in the embodiment 1 so that the above-mentioned object is able to be achieved.

A separator for an electric energy storage device of the present invention includes, as mentioned in the embodiment 9, using a glass fiber material prepared by unpacking of the glass fiber package mentioned in the embodiment 1 so that the above-mentioned object is able to be achieved.

A separator for a valve regulated lead-acid battery of the present invention includes, as mentioned in the embodiment 10, using a glass fiber material prepared by unpacking of the glass fiber package mentioned in the embodiment 2 so that the above-mentioned object is able to be achieved.

A separator for an electric double layer capacitor of the present invention includes, as mentioned in the embodiment 11, using a glass fiber material prepared by unpacking of the glass fiber package mentioned in the embodiment 2 so that the above-mentioned object is able to be achieved.

DETAILED DESCRIPTION OF THE PREFERRED EMBODIMENTS

According to the present invention, in a glass fiber package where a glass fiber aggregate which contains alkali-containing glass wool fiber of a very small diameter having an average fiber size of 5 μm or less or, particularly, less than 1 μm and containing 5% or more by weight or, particularly, 10% or more by weight of alkali metal oxide components is packed in a compressed state to give a form which is able to be handled as a freight, it is made into a compressed package in which the bulk density is within a range of 80 to 135 kg/m$^3$ whereby it is now possible to give a glass fiber package in which fiber breakage (lowering in the fiber length) and fiber adhesion caused by compression packing is hardly resulted even upon a long-term storage and the properties inherent to the glass fiber immediately after its manufacture is apt to be maintained. Accordingly, when the glass fiber material by unpacking such a glass fiber package is used and made into a glass fiber product or, particularly, into a separator for an electric energy storage device such as a valve regulated lead-acid battery or an electric double layer capacitor, it is now possible to give a glass fiber product in which deterioration of properties accompanied by fiber breakage (lowering in the fiber length) and fiber adhesion is rarely noted unlike in the conventional products.

Further, in a method of packing a glass fiber where a glass fiber aggregate which contains alkali-containing glass wool fiber of a very small diameter having an average fiber size of 5 μm or less or, particularly, less than 1 μm and containing 5% or more by weight or, particularly, 10% or more by weight of alkali metal oxide components is packed in a compressed state to give a form which is able to be handled as a freight, it is compressed under such a condition that the bulk density of the glass fiber aggregate does not exceed 135 kg/m$^3$ so as to give a package where the bulk density is 80 to 135 kg/m$^3$ and, accordingly, it is now possible to provide a method for packing a glass fiber in which fiber breakage (lowering in the fiber length) and fiber adhesion caused by compression packing is hardly resulted even upon a long-term storage and the properties inherent to the glass fiber immediately after its manufacture is apt to be maintained.

The glass fiber package of the present invention is such a thing that a glass fiber aggregate which contains alkali-containing glass wool fiber having an average fiber size of 5 μm or less and containing 5% or more by weight of alkali metal oxide components manufactured by a method such as, for example, the above-mentioned flame attenuation process or the above-mentioned centrifugal process (rotary process or rotary fiberization process) is packed in a compressed state to give a form which is able to be handled as a freight whereupon a compressed package where the yardstick for packing density (degree of compression) in terms of bulk density is 80 to 135 kg/m$^3$ is prepared. As a result, it is now possible that the transportation efficiency (packing efficiency) of the above glass fiber aggregate is enhanced as high as possible and, at the same time, deterioration of properties (fiber breakage and fiber adhesion) of the glass fiber material due to a compression packing is prevented as much as possible. Thus, when the bulk density of the glass fiber package is less than 80 kg/m$^3$, an effect of enhancing the transportation effect (packing effect) of the glass fiber aggregate is low while, when the bulk density of the glass fiber package is more than 135 kg/m$^3$, an effect of preventing the deterioration of properties (fiber breakage and fiber adhesion) of the glass fiber material due to a compressive packing is low whereby any of such cases is improper. When the bulk density of the glass fiber package is within the stipulated range, deterioration of properties (fiber breakage and fiber adhesion) of the glass fiber material due to compression packing is able to be prevented as much as possible even in the case of the glass fiber where an average fiber size is less than 1 μm in which the above fiber breakage phenomenon and the above fiber adhesion phenomenon are apt to happen although the strength after being made into a sheet (entangling action of glass fiber) and the liquid-retaining characteristic are enhanced as the glass fiber and where the content of the alkali metal oxide components is 10% or more by weight in which the above fiber adhesion phenomenon is apt to happen although resistance to an acid is improved, then it is now possible to prevent the deterioration of properties (fiber breakage and fiber adhesion) of the glass fiber material due to the compression packing as much as possible whereby it is now possible to advantageously used as a material for a separator particularly for a valve regulated lead-acid battery and for an electric double layer capacitor.

The method for packing a glass fiber according to the present invention is that, in a method for packing a glass fiber where a glass fiber aggregate which contains alkali-containing glass wool fiber having an average fiber size of as fine as 5 μm or less or, particularly, less than 1 μm and containing 5% or more by weight or, particularly, 10% or more by weight of alkali metal oxide components manufactured by a method such as, for example, the above-mentioned flame attenuation process or the above-mentioned centrifugal process (rotary process or rotary fiberization process) is packed in a compressed state to give a form which is able to be handled as a freight, the above glass fiber aggregate is packed by compressing the glass fiber aggregate so that the bulk density of the glass fiber aggregate is made to not exceeding 135 kg/m$^3$ even for a short time. As a result thereof, it is now possible that the transportation efficiency (packing efficiency) of the glass fiber aggregate is enhanced and, at the same time, deterioration of properties (fiber breakage and fiber adhesion) of the glass fiber material due to the compressive packing is prevented as much as possible.

The above-mentioned glass fiber aggregate covers not only the original cotton (raw cotton) of glass fiber in an unprocessed state manufactured by a method such as, for example, the above-mentioned flame attenuation process or the above-mentioned centrifugal process (rotary process or rotary fiberization process) but also that which is in a state where the above original cotton (raw cotton) of glass fiber is processed (such as a glass fiber paper sheet prepared by a wet papermaking process).

EXAMPLES

Now the Examples of the present invention will be illustrated in detail together with Comparative Examples.

Examples 1 to 3

A glass fiber aggregate (25 kg) which contained alkali-containing glass wool fiber of an average fiber size of 0.8 μm being made into fiber and manufactured by a flame attenuation process where the glass composition contained 63 to 70% by weight of $SiO_2$ component, 2 to 5% by weight of $Al_2O_3$ component, 4 to 8% by weight of CaO component, 2 to 4% by weight of MgO component, 14 to 18% by weight of alkali metal oxide components ($Na_2O+K_2O+Li_2O_3$), 3 to 8% by weight of $B_2O_3$ component and 1% or less by weight of other components was compressed almost uniformly, the outer circumference was preliminarily fixed at three places with binding belts followed by packing in a bag, the above binding belts for preliminary fixing were detached and the outer circumference was fixed at three places with binding belts from the outer side of the bag to give a glass fiber package where packing density (bulk density of the glass fiber aggregates as a whole) was 111 kg/m$^3$, 118 kg/m$^3$ or 126 kg/m$^3$. Each of them was used as a glass fiber package of Example 1, Example 2 or Example 3, respectively. During the course of the above packing operation, the bulk density of the above glass fiber aggregate did not exceed 135 kg/m$^3$ even for a short time in any of the cases of Examples 1 to 3.

Comparative Examples 1 and 2

A glass fiber aggregate (25 kg) which contained alkali-containing glass wool fiber having an average fiber size of 0.8 μm manufactured by the same manner as in the Examples was compressed almost uniformly, the outer circumference was preliminarily fixed at three places with binding belts followed by packing in a bag, the above binding belts for a preliminary fixing were detached and the outer circumference was fixed at three places with binding belts from the outer side of the bag to give a glass fiber package where packing density (bulk density of the glass fiber aggregates as a whole) was 145 kg/m$^3$ or 154 kg/m$^3$. Each of them was used as a glass fiber package of Comparative Example 1 or Comparative Example 2, respectively.

Then the glass fiber packages manufactured in the above Examples 1 to 3 and Comparative Examples 1 and 2 were stored for 0 month (one day at the longest; hereinafter, it has the same meaning) followed by unpacking and Schopper's freeness (an index for an apparent fiber size) was measured by the following method for each of the resulting glass fiber materials. Further, each of the glass fiber materials unpacked after storing for 0 month of the glass fiber packages of Examples 1 to 3 and Comparative Examples 1 and 2 was used to prepare a glass fiber paper sheet through wet papermaking process and tensile strength, elongation, toughness, fiber strength and crack, if any, upon bending of the sheet were measured by the following methods. The result is shown in Table 1.

(Schopper's Freeness (SR))

(1) The above glass fiber (2 g) after drying was collected, 0.8 liter of water was added thereto and the mixture was disaggregated for 100 seconds.

(2) After the disaggregation, it was transferred into a graduated cylinder and was made one liter by addition of water thereto.

(3) The sample water was poured into a Shopper's tester for degree of beating (in accordance with JIS P 8121), a conical valve was opened and the sample water was flown down.

(4) After discharge of the water from the side pipe was stopped, the amount of discharged water (X) was read.

(5) Schopper's freeness (SR) was calculated by the following formula.

$SR(\text{degree})=(1000-X)/10$ (Preparation of Glass Fiber Paper Sheet)

The glass fiber material (100% by weight) prepared by unpacking of the above glass fiber package after storing for 0 month was dispersed in an aqueous solution of sulfuric acid of pH 3 and subjected to a wet paper manufacturing using a paper manufacturing machine of an inclination type followed by heat-drying to give a glass fiber paper sheet having a basis weight of about 170 g/m$^2$ for a valve regulated lead-acid battery.

(Tensile Strength)

Tensile strength (N/25 mm width) was measured by a method according to SBA S 0406. Furthermore, SBA (Standard of Battery Association) is a standard which Battery Association of Japan establishes.

(Elongation)

Distance ($C_1$) between the chucks when the sample was broken in the above tensile strength test was measured and, from the distance ($C_0$) between the chucks in the initial stage, elongation was calculated according to the following formula.

$\text{Elongation}(\%)=[(C_1-C_0)/C_0]\times 100$ (Toughness)

Toughness($N$%/25 mm width)=Tensile strength ($N$/25 mm width)×Elongation(%)

(Fiber Strength)

Fiber strength ($N$%/25 mm width degree)=Toughness ($N$%/25 mm width)/Schopper's freeness $SR$(degree)

(Bending Test of the Sheet)

The above glass fiber paper sheet was bent in U shape and crack, if any, in the bent area was observed. When no crack was confirmed, it was marked "O"; when small cracks were confirmed, it was marked "Δ"; and, when cracks were confirmed in one half or more of the sheet in a transverse direction, it was marked "x".

was never made more than 135 kg/m$^3$, it was confirmed that the toughness of the glass fiber paper sheet prepared from the above was as high as 41.9 to 92.1 N %/25 mm, that the strength being sufficient as a separator for valve regulated lead-acid battery was available and that the fiber breakage phenomenon (lowering of the fiber length) caused by a compression packing was suppressed to be low. In the bending test of the glass fiber paper sheet, no crack was generated at the area which was bent in U shape and it was confirmed that the sheet is able to be advantageously used even in the case of use of bending into U shape as a separate for a valve regulated lead-acid battery. On the contrary, in the glass fiber packages of Comparative Examples 1 and 2 where packing was conducted under a packing density of 145 to 154 kg/m$^3$, tough-

TABLE 1

| | Items | Units | Examples 1 | Examples 2 | Examples 3 | Comp Ex 1 | Comp Ex 2 |
|---|---|---|---|---|---|---|---|
| Glass Fiber Package | Weight | kg | 25 | 25 | 25 | 25 | 25 |
| | Apparent Volume | m$^3$ | 0.226 | 0.211 | 0.199 | 0.172 | 0.162 |
| | Bulk Density (Packing Density) | kg/m$^3$ | 111 | 118 | 126 | 145 | 154 |
| Glass Fiber | Schopper's Freeness (SR) | ° | 48.9 | 31.4 | 49.6 | 47.2 | 11.7 |
| Glass Fiber Paper Sheet | Basis Weight | g/m$^2$ | 171 | 168 | 170 | 169 | 172 |
| | Tensile Strength | N/25 mm width | 11.5 | 8.2 | 11.2 | 8.4 | 1.3 |
| | Elongation | % | 8.0 | 5.1 | 6.5 | 4.5 | 2.9 |
| | Toughness | N %/25 mm width | 92.1 | 41.9 | 72.7 | 37.7 | 3.8 |
| | Fiber Strength | N %/25 mm width deg | 1.88 | 1.33 | 1.47 | 0.80 | 0.32 |
| | Sheet Bending Test | — | O | O | O | Δ | X |

Examples 4 to 5 and Comparative Example 3

After that, in accordance with the methods of the above Examples 1 to 3 and Comparative Examples 1 and 2, a glass fiber package where the packing density (bulk density of the glass fiber aggregate as a whole) was 110 kg/m$^3$, 130 kg/m$^3$ or 150 kg/m$^3$ was prepared (each of them was used as the glass fiber package of Example 4, Example 5 or Comparative Example 3, respectively) and stored in a storehouse and Schopper's freeness and fiber strength thereof after each of 3 months, 6 months and 12 months were measured according to the methods conducted in the above Examples 1 to 3 and Comparative Examples 1 and 2. The result is shown in Table 2.

ness of the glass fiber paper sheet was as low as 3.8 to 37.7 N %/25 mm whereby the fiber breakage phenomenon (lowering of fiber length) caused by a compression packing was significant. Further, in the bending test of the glass fiber paper sheet, cracks were generated at the area of being bent in U shape and, for using as a separator for a valve regulated lead-acid battery, both strength and bending processing ability were insufficient.

(2) With regard to the glass fiber package of Examples 4 and 5 manufactured by the same manner as in Examples 1 to 3 where bulk density of the package was made 110 and 130 kg/m$^3$, lowering even after storing for 12 months in terms of the Schopper's freeness measured as a yardstick for an apparent fiber size which estimates the degree of fiber adhesion

TABLE 2

| Items | | Units | Ex 4 | Ex 5 | Comp Ex 3 |
|---|---|---|---|---|---|
| Bulk Density of Package | | kg/m$^3$ | 110 | 130 | 150 |
| Schopper's Freeness (SR) after Stored for 0 to 12 Month(s) | After stored for 0 month | ° | 47 | 48 | 48 |
| | After stored for 3 months | ° | 48 | 46 | 45 |
| | After stored for 6 months | ° | 47 | 47 | 43 |
| | After stored for 12 months | ° | 47 | 45 | 41 |
| Fiber Strength after Stored for 0 to 12 Month(s) | After stored for 0 month | N %/25 mm width deg | 1.9 | 1.8 | 0.8 |
| | After stored for 3 months | N %/25 mm width deg | 2.0 | 1.7 | 0.8 |
| | After stored for 6 months | N %/25 mm width deg | 1.7 | 1.5 | 0.6 |
| | After stored for 12 months | N %/25 mm width deg | 1.6 | 1.5 | 0.3 |

From the results of Table 1 and Table 2, the followings were noted.

(1) In the glass fiber packages of Examples 1 to 3 where the packing density was made 111 to 126 kg/m$^3$ and packing was conducted in such a manner that, during the packing operations, the bulk density of the glass fiber aggregate as a whole phenomenon using a glass fiber material after stored for 0 to 12 month(s) was as low as 0 to 6% whereby it was confirmed that, even in a long-term storage, a fiber adhesion phenomenon (an increase in fiber size) is suppressed to be low. In the fiber strength measured by the use of the glass fiber material after storing for 0 to 12 month(s), lowering even after storing for 12 months was as low as 16 to 17% whereby it was confirmed that, even in a long-term storage, lowering in the fiber strength was suppressed to be low. On the contrary, in the glass fiber package of Comparative Example 3 where the bulk density of the package was made 150 kg/m³, Schopper's freeness after storing for 12 months lowered to an extent of 15% and fiber strength after storing for 12 months lowers to an extent of 63% whereby the degrees of lowering in the fiber adhesion phenomenon (an increase in fiber size) and the fiber strength in a long-term storage were big.

What is claimed is:

1. A glass fiber material comprising:
a glass fiber aggregate which contains an alkali-containing glass wool fiber is packed in a compressed state to take packing efficiency upon transportation or volume reducing rate into consideration so that the glass fiber aggregate is made into a compressed glass fiber package which is able to be handled as a freight where the bulk density is 80 to 135 kg/m³;
wherein the alkali-containing glass wool fiber is mainly used as a main material of a separator for an electric energy-storage device or a filter paper,
wherein the alkali-containing glass wool fiber is manufactured by a flame attenuation process or a centrifugal process and made into fiber, having an average fiber size of 5 μm or less and containing 5% or more by weight of alkali metal oxide components, and
wherein the glass fiber aggregate is an original cotton in an unprocessed state of the alkali-containing glass wool fiber manufactured by the flame attenuation process or the centrifugal process and made into fiber.

2. The glass fiber material according to claim 1, wherein the glass fiber has an average fiber size of less than 1 μm.

3. The glass fiber material according to claim 1, wherein the glass fiber contains 10% or more by weight of the alkali metal oxide components.

4. A method for packing a glass fiber material comprising:
a glass fiber aggregate which contains an alkali-containing glass wool fiber is packed in a compressed state to take packing efficiency upon transportation or volume reducing rate into consideration by pressurizing under the condition where the bulk density of the glass fiber aggregate does not exceed 135 kg/m³ so that the glass fiber aggregate is made into a compressed glass fiber package which is able to be handled as a freight where the bulk density is 80 to 135 kg/m³,
wherein the alkali-containing glass wool fiber is mainly used as a main material of a separator for an electric energy-storage device or a filter paper,
wherein the alkali-containing glass wool fiber is manufactured by a flame attenuation process or a centrifugal process and made into fiber, having an average fiber size of 5 μm or less and containing 5% or more by weight of alkali metal oxide components, and
wherein the glass fiber aggregate is an original cotton in an unprocessed state of the alkali-containing glass wool fiber manufactured by the flame attenuation process or the centrifugal process and made into fiber.

5. The method for packing the glass fiber material according to claim 4, wherein the glass fiber has an average fiber size of less than 1 μm.

6. The method for packing the glass fiber material according to claim 4, wherein the glass fiber contains 10% or more by weight of the alkali metal oxide components.

7. A glass fiber product, comprising using glass fiber material prepared by unpacking of the glass fiber package mentioned in claim 1.

8. A filter paper, comprising using glass fiber material prepared by unpacking of the glass fiber package mentioned in claim 1.

9. A separator for an electric energy storage device, comprising using glass fiber material prepared by unpacking of the glass fiber package mentioned claim 1.

10. A separator for a valve regulated lead-acid battery, comprising using the glass fiber material mentioned in claim 2.

11. A separator for an electric double layer capacitor, comprising using the glass fiber material mentioned in claim 2.

* * * * *